3,167,437
PROCESS FOR PREPARING STERILIZED CONCENTRATED MILK PRODUCTS

Abraham Leviton, Washington, D.C., and Michael J. Pallansch, Vienna, Va., assignors to the United States of America as represented by the Secretary of Agriculture
No Drawing. Filed Apr. 23, 1962, Ser. No. 189,647
21 Claims. (Cl. 99—212)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of our application bearing Serial No. 53,597, filed August 24, 1960, now U.S. Patent No. 3,031,315.

This invention relates to a process for preparing concentrated milk products, and particularly relates to a process for preparing concentrated milk products with improved heat stability and storage life.

Sterile concentrated milk products such as evaporated milk are ordinarily prepared by concentrating normal or modified fluid milk to produce a concentrate of the desired content of total solids and the desired ratio between fat and total solids, preferably homogenizing at some point in the preparation of the concentrate, packaging the concentrate in cans or bottles, and sterilizing the packaged concentrate with heat.

There are well-recognized liabilities in the sterile milk products prepared by previously developed processes. It is known that the use of high temperatures and short times of sterilization results in sufficient destruction of contaminating organisms without the unwanted side-effects of imparting off-color and off-flavors and of heat coagulation which may occur with the long heating period required if lower sterilizing temperatures are used. However, use of the high temperature-short time (HTST) method introduces the undesirable side effect of gel formation during storage of the product prepared by this method.

Gelling manifests itself in a characteristic manner. A storage period in which viscosity usually decreases is followed by one in which viscosity remains fairly steady. Finally, a period is observed in which the viscosity rises, slowly at first, then more rapidly, until the concentrated milk, instead of flowing freely, begins to move as a body possessing a liver-like consistency. The soft body gradually gives way to a firm one, inhomogeneities appear and syneresis (exudation of milk serum) may be observed.

An object of the present invention is to produce a packaged sterile concentrated milk product which is stable in storage for long periods of time against gel formation and stratification. Other objects and a fuller understanding of the invention may be had by referring to the following description and claims.

In general, according to the present invention a high temperature-short time sterilized concentrated milk product of improved storage stability is prepared by incorporating therein about from 0.003 to 0.015 mole per kilogram of milk solids-not-fat of a non-toxic, water soluble, divalent salt of zinc or iron. Sterilized concentrated milk products containing the zinc or ferrous salt, for example, zinc sulfate or ferrous sulfate, have markedly improved storage life over products which are exactly the same with the exception that no salt was added. The improvement in storage life of sterilized concentrated milk products prepared using the HTST method of sterilization is particularly advantageous because these products, limited by conventional "long-hold" procedures to about 27% whole milk solids or about 19% skim milk solids, may now contain an additional 50% milk solids without serious side-effects.

The method of sterilizing at about 280° F. (137° C). with a holding period of about 5 to 15 seconds, packaging before or after sterilization, is an example of the high temperature-short time (HTST) method. While the use of slightly lower temperatures with slightly longer holding times also falls into the category of an HTST method, an important consideration in all HTST methods is rapid heating to desired temperature and rapid cooling after sterilizing. Equipment being available, better control is obtained by sterilizing, cooling, and than packaging by aseptic procedures.

In a preferred embodiment of the present invention the step of adding the divalent iron or zinc salt is combined with steps for making the optimum quality HTST sterilized concentrated milk product, these steps including forewarming the milk, concentrating the forewarmed milk, homogenizing the concentrated milk and sterilizing by the HTST method.

While we prefer to disperse an aqueous solution of the iron or zinc salt in the concentrated milk, the particular means of combining the salt with the milk and the time at which this combination is performed is considered to be optional as long as good distribution of the added salt throughout the concentrated product is achieved. Although it is preferred to add the ferrous or zinc salt prior to sterilization, it may be desirable at times to modify the process by changing the order of the steps. These salts in sufficiently high concentrations added to concentrated milk before sterilization conduce to a thickening of the milk concentrate during sterilization (see Table I) which with some heat-labile milks may reach undesirable proportions. To obviate this condition, other courses of action are available. For example, the ferrous or zinc salt as a sterile aqueous solution is added to such milks after concentration and sterilization; or the milk is concentrated after sterilization, in which case the salt is added to the milk as the initial step before processing. It will be obvious that the foregoing modifications may be carried out without departing from the spirit of the invention. In the example which follows, a significantly improved product is obtained even without the step of homogenizing the concentrated milk.

While an advantage accrues to the use of higher concentrations of ferrous and zinc salts than those demonstrated, the upper limit must conform to the concentration limits imposed by law on the use of stabilizing salts in evaporated milk.

In demonstrating the present invention a storage temperature of 30° C. was selected, and viscosity measurements were made at this temperature. The improvement in stability of the products is considered as applicable to all storage conditions.

The storage life of a sample is taken as the time required for the "stirred-out" viscosity to reach a value which is twice the minimum viscosity observed during storage. The "stirred-out" viscosity is defined as the viscosity of a sample after the position of the sample in a capillary tube has been reversed twice by the application of centrifugal force.

The practice of this invention is illustrated by the following examples.

EXAMPLE 1

Skim milk was forewarmed at about 100° C. for 17 minutes and concentrated in vacuo to 30.8% solids. To 100 gram aliquots of the concentrated milk was added 12 grams of a salt solution containing an amount of salt so that the final mixture contained added salt at a level of 0.015 mole per kilogram of milk solids-not-fat. The salts added and concentration of metallic ion in terms of grams per kilogram milk solids-not-fat were as follows: magnesium sulfate, 0.36; zinc sulfate, 0.98; cadmium chloride, 1.7; ferrous sulfate, 0.84; nickel sulfate, 0.88; manganous sulfate, 0.82; and cupric sulfate, 0.96; respectively. A control aliquot was prepared by adding 12 grams of distilled water (no salt). Each of the aliquots was intimately mixed to provide uniform composition throughout the aliquot.

Viscosity measurements were made in bomb microviscometers fabricated from thin-walled capillary tubing and containing a small glass bead within the tubing. For each aliquot a sample was introduced into a bomb microviscometer and a viscosity determination made without sterilization. Groups of similar microviscometers were loaded, sealed, sterilized at 280° F. (137.4° C.) for 5 seconds, cooled to room temperature, and stored at 30° C. During storage the samples were turned occasionally to retard sedimentation. Viscosity ("stirred-out") measurements, determined at 30° C. with the viscometers inclined at an angle of approximately 10° to the vertical, were made periodically, measuring the time of transit of the glass bead between two marks on the microviscometer, the results calculated as centipoises, and recorded as in Table I.

Table I
STORAGE LIFE OF SKIM MILK CONCENTRATES (27.5% MILK SOLIDS) WITH AND WITHOUT ADDED SALTS

| Added Salt | Concentration, moles per kg. solids-not-fat | Concentration, Metallic Ion, g. per kg. solids-not-fat | Viscosity Before Sterilization,[1] centipoises | Viscosity After Sterilization,[2] centipoises | Minimum Viscosity During Storage, centipoises | Storage Life,[3] days | Viscosity After 46 days, centipoises |
|---|---|---|---|---|---|---|---|
| None | | | 9.5 | 11.6 | 9.9 | 21 | [4] ∞ |
| MgSO$_4$ | 0.015 | 0.36 | 8.7 | 13.3 | 10.9 | 26 | ∞ |
| ZnSO$_4$.7H$_2$O | 0.015 | 0.98 | 7.9 | 35.0 | 13.7 | 46 | 16.5 |
| CdCl$_2$ | 0.015 | 1.7 | 8.7 | 13.6 | 9.4 | 36 | ∞ |
| FeSO$_4$.7H$_2$O | 0.015 | 0.84 | 9.5 | 17.5 | 9.0 | 46 | 9.0 |
| NiSO$_4$.6H$_2$O | 0.015 | 0.88 | 9.1 | 12.6 | 10.0 | 25 | ∞ |
| MnSO$_4$.H$_2$O | 0.015 | 0.82 | 8.6 | 12.2 | 9.4 | 46 | 19.0 |
| CuSO$_4$.5H$_2$O | 0.015 | 0.96 | 8.4 | 16.5 | 16.5 | 14 | ∞ |

[1] All viscosity measurements at 86° F.
[2] Concentrate sterilized by heating at 280° F. for 5 seconds.
[3] Samples stored at 86° F.
[4] Jellation had occurred.

The data of Table I show that the divalent salt of a particular metal has an upredictable effect upon the storage life of packaged sterilized concentrated milk. The zinc and ferrous salts were especially effective in increasing the storage life, the results being comparable to that obtained with the manganous salt. Magnesium and nickel salts did not appreciably increase the storage life. The copper salt had an adverse effect on the storage stability of the concentrated milk.

Addition of salts at the level employed in Example 1 has no significant effect upon the flavor of the product.

The upper limit for adding salts in view of the astringent character they lend to the milk is about 0.06 mole per kilogram of milk solids-not-fat, four times the level used in Example 1.

The improvement in storage life is obtained with very low levels of zinc or iron salts, as demonstrated in the following example.

EXAMPLE 2

The procedures of Example 1 were repeated with the exception that the amount of salt added provided a level of only 0.003 mole per kilogram of milk solids-not-fat, and the salt was added in 10 grams of aqueous solution so that the concentrated milk products had a slightly higher solids content than those of Example 1.

Concentration of metallic ion in the concentrated milk products and other data pertaining to this example are presented in Table II.

Table II
STORAGE LIFE OF SKIM MILK CONCENTRATES (28.0 MILK SOLIDS) WITH AND WITHOUT ADDED SALTS

| Added Salt | Concentration, moles per kg. solids-not-fat | Concentration Metallic Ion, g. per kg. solids-not-fat | Viscosity Before Sterilization,[1] centipoises | Viscosity After Sterilization,[2] centipoises | Minimum Viscosity During Storage, centipoises | Storage Life,[3] days |
|---|---|---|---|---|---|---|
| None | | | 9.7 | 12.7 | 9.6 | 18 |
| MgSO$_4$ | 0.003 | 0.072 | 9.5 | 14.2 | 9.7 | 20 |
| ZnSO$_4$.7H$_2$O | 0.003 | 0.196 | 9.3 | 13.6 | 8.7 | 26 |
| CdCl$_2$ | 0.003 | 0.336 | 9.5 | 14.0 | 10.8 | 21 |
| FeSO$_4$.7H$_2$O | 0.003 | 0.167 | 9.6 | 13.9 | 8.9 | 25 |
| NiSO$_4$.6H$_2$O | 0.003 | 0.176 | 9.5 | 13.9 | 9.5 | 20 |
| MnSO$_4$.H$_2$O | 0.003 | 0.165 | 9.5 | 13.1 | 9.2 | 22 |
| CuSO$_4$.5H$_2$O | 0.003 | 0.191 | 9.4 | 13.4 | 13.4 | 17 |

[1] All viscosity measurements at 86° F.
[2] Concentrate sterilized by heating at 280° F. for 5 seconds.
[3] Samples stored at 86° F.

The inventive process, illustrated in Examples 1 and 2 with improvement of storage life of sterilized concentrated skim milk, is equally applicable to HTST sterilized concentrated whole milk products, including conventional concentrations and those with various proportions of fat content.

We claim:

1. A high temperature-short time sterilized concentrated milk product of improved storage stability comprising a high temperature-short time sterilized concentrated milk having incorporated therein about from 0.003 to 0.015 mole per kilogram of milk solids-not-fat of a water soluble, non-toxic, divalent salt of a metal selected from the group consisting of zinc and iron.

2. The product of claim 1 in which the salt of a metal is zinc sulfate.

3. The product of claim 1 in which the salt of a metal is ferrous sulfate.

4. A process comprising forewarming a milk, concentrating the forewarmed milk, homogenizing the concentrated milk, dispersing in the homogenized concentrated milk about from 0.003 to 0.015 mole per kilogram of milk solids-not-fat of a water soluble, non-toxic, divalent salt of a metal selected from the group consisting of zinc and iron to give a concentrated milk product, sterilizing the concentrated milk product by a high temperature-short time method, and aseptically packaging the sterilized milk product to give a packaged sterilized concentrated milk product with improved storage stability.

5. The process of claim 4 in which the salt of a metal is zinc sulfate.

6. The process of claim 4 in which the salt of a metal is ferrous sulfate.

7. A process comprising forewarming a milk, concentrating the forewarmed milk, dispersing in the concentrated milk about from 0.003 to 0.015 mole per kilogram of milk solids-not-fat of a water soluble, non-toxic, divalent salt of a metal selected from the group consisting of zinc and iron to give a concentrated milk product, homogenizing the concentrated milk product, sterilizing the homogenized concentrated milk product by a high temperature-short time method, and aseptically packaging the sterilized milk product to give a packaged sterilized concentrated milk product with improved storage stability.

8. The process of claim 7 in which the salt of a metal is zinc sulfate.

9. The process of claim 7 in which the salt of a metal is ferrous sulfate.

10. A process comprising forewarming a skim milk, concentrating the forewarmed skim milk, dispersing in the concentrated skim milk about from 0.003 to 0.015 mole per kilogram of milk solids-not-fat of a water soluble, non-toxic, divalent salt of a metal selected from the group consisting of zinc and iron to give a concentrated skim milk product, sterilizing the concentrated skim milk product by a high temperature-short time method, and aseptically packaging the sterilized skim milk product to give a packaged sterilized concentrated skim milk product with improved storage stability.

11. The process of claim 10 in which the salt of a metal is zinc sulfate.

12. The process of claim 10 in which the salt of a metal is ferrous sulfate.

13. A process comprising forewarming a milk, concentrating the forewarmed milk, homogenizing the concentrated milk, sterilizing the homogenized concentrated milk by a high temperature-short time method, aseptically dispersing in the sterilized concentrated milk about from 0.003 to 0.015 mole per kilogram of milk solids-not-fat of a sterile, water soluble, non-toxic divalent salt of a metal selected from the group consisting of zinc and iron, and aseptically packaging the sterilized concentrated milk product to give a packaged sterilized concentrated milk product with improved storage stability.

14. The process of claim 13 in which the salt of metal is zinc sulfate.

15. The process of claim 13 in which the salt of a metal is ferrous sulfate.

16. A process comprising dispersing in a milk about from 0.003 to 0.015 mole per kilogram of milk solids-not-fat of a water soluble, non-toxic, divalent salt of a metal selected from the group consisting of zinc and iron to give a milk product, forewarming the milk product, sterilizing the forewarmed milk product by a high temperature-short time method, aseptically homogenizing the sterilized milk product, aseptically concentrating the sterilized homogenized milk product, and aseptically packaging the concentrated milk product to give a packaged sterilized concentrated milk product with improved storage stability.

17. The process of claim 16 in which the salt of a metal is zinc sulfate.

18. The process of claim 16 in which the salt of a metal is ferrous sulfate.

19. A process comprising forewarming a milk, dispersing in the forewarmed milk about from 0.003 to 0.015 mole per kilogram of milk solids-not-fat of a water soluble, non-toxic, divalent salt of a metal selected from the group consisting of zinc and iron to give a forewarmed milk product, sterilizing the forewarmed milk product by a high temperature-short time method, aseptically homogenizing the sterilized milk product, aseptically concentrating the sterilized, homogenized milk product, and aseptically packaging the concentrated milk product to give a packaged sterilized concentrated milk product with improved storage stability.

20. The process of claim 19 in which the salt of a metal is zinc sulfate.

21. The process of claim 19 in which the salt of a metal is ferrous sulfate.

References Cited by the Examiner
UNITED STATES PATENTS
857,700   1/61   Great Britain.

A. LOUIS MONACELL, *Primary Examiner.*
ABRAHAM H. WINKELSTEIN, *Examiner.*